United States Patent
Snyder

(10) Patent No.: US 9,835,521 B1
(45) Date of Patent: Dec. 5, 2017

(54) METHODS AND SYSTEMS FOR ENCODER SYNCHRONIZATION USING SPARK AND FUEL MODIFICATION

(71) Applicant: Brunswick Corporation, Lake Forest, IL (US)

(72) Inventor: Matthew W. Snyder, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 318 days.

(21) Appl. No.: 14/695,660

(22) Filed: Apr. 24, 2015

(51) Int. Cl.
  *F02D 35/02* (2006.01)
  *G01M 15/05* (2006.01)

(52) U.S. Cl.
  CPC .................. *G01M 15/05* (2013.01)

(58) Field of Classification Search
  CPC .... G01M 15/05; G01M 15/046; G01M 15/06; G01M 15/08; F02D 35/023; F02D 35/028; F02D 41/0097; F02P 5/1556; F02P 5/06; F02P 5/153; F02P 5/1555; F02P 17/02
  USPC ......... 123/435, 436, 406.17, 406.18, 406.22, 123/406.23, 406.24, 406.41, 406.47, 123/406.58, 406.59; 701/103–105, 110, 701/111; 73/114.16, 114.22, 114.25, 73/114.27, 114.63
  See application file for complete search history.

(56) References Cited

U.S. PATENT DOCUMENTS

| | | | |
|---|---|---|---|
| 5,562,082 A | 10/1996 | Norppa et al. | |
| 5,701,865 A | 12/1997 | Thomas et al. | |
| 5,758,625 A | 6/1998 | Ponti | |
| 6,109,986 A | 8/2000 | Gaynor et al. | |
| 6,571,776 B1 | 6/2003 | Dunsworth | |
| 6,581,564 B2* | 6/2003 | Ogawa | F02D 41/3064 123/295 |
| 6,889,663 B2 | 5/2005 | Dunsworth et al. | |
| 7,069,140 B2 | 6/2006 | Sheikh et al. | |
| 7,155,330 B2 | 12/2006 | Dunsworth et al. | |
| 7,597,072 B2* | 10/2009 | Stein | F01L 13/0036 123/304 |
| 8,042,513 B2* | 10/2011 | Kwiatkowski | F02D 41/0002 123/321 |

FOREIGN PATENT DOCUMENTS

GB  2 422 688 A  *  8/2006  ............. F02D 41/04

OTHER PUBLICATIONS

Unpublished U.S. Appl. No. 14/489,075, filed Sep. 17, 2014.

\* cited by examiner

*Primary Examiner* — Hai Huynh
(74) *Attorney, Agent, or Firm* — Andrus Intellectual Property Law, LLP

(57) ABSTRACT

In one embodiment, a method of determining correct engine phase in an internal combustion engine without a cam sensor, the engine having a plurality of piston-cylinders that cause rotation of a crankshaft and a fuel delivery assembly associated with each of the plurality of piston-cylinders, the method comprising monitoring an engine parameter, modifying an amount of fuel delivered to a known piston-cylinder, advancing a spark time one of the plurality of piston-cylinders, and determining an actual engine phase based on a change in the engine parameter.

20 Claims, 11 Drawing Sheets

METHODS AND SYSTEMS FOR ENCODER SYNCHRONIZATION USING SPARK AND FUEL MODIFICATION

FIELD

The present disclosure relates to internal combustion engines such as engines for propelling marine vessels, and to systems and methods for determining engine phase without input from a cam shaft sensor.

BACKGROUND

A 4-stroke internal combustion engine typically comprises an intake valve for drawing an air/fuel mixture into a cylinder's combustion chamber and an exhaust valve for allowing combustion byproducts to escape from the chamber. A spark plug ignites the air/fuel mixture in a cylinder to move a piston, connecting rod, and crankshaft to provide power to the engine. These components are typically controlled by an engine control unit ("ECU"), which controls, among other things, the timing of fuel injection, the amount of fuel to be injected, and the timing of the spark. The spark time can be controlled to adjust the amount of combustion in a cylinder, and thus the force exerted on the piston, connecting rod, and crankshaft.

In typical fuel injection engine systems, it is desirable to know the position of each cylinder in order to properly time fuel injection. Commonly, a cam sensor, or a sensor on the cam shaft, is utilized to determine engine phase. However, for some engines it is desirable to eliminate the use of a cam sensor, such as to reduce cost and complexity of an engine or where installation of a cam sensor is difficult and presents quality control issues.

U.S. Pat. No. 6,109,986 discloses an idle speed control system for a marine propulsion system. The system controls an amount of fuel injected into the combustion chamber of an engine cylinder as a function of the error between a selected target speed and an actual speed. The speed can be engine speed measured in revolutions per minute or, alternatively, it can be boat speed measured in nautical miles per hour or kilometers per hour. By comparing target speed to actual speed, the control system selects an appropriate pulse width length for the injection of fuel into the combustion chamber and regulates the speed by increasing or decreasing the pulse width.

U.S. patent application Ser. No. 14/489,075 discloses systems and methods for controlling internal combustion engines having a plurality of piston-cylinders that cause rotation of a crankshaft. A crankshaft sensor is configured to sense rotational speed of the crankshaft, and a controller is configured to calculate an acceleration for each piston-cylinder based on the rotational speed of the crankshaft and then balance the accelerations of the respective piston-cylinders by modifying a combustion input to one or more of the piston-cylinders in order to reduce engine vibration.

U.S. Pat. No. 5,701,865 discloses a method of adjusting idle spark for an individual cylinder of an internal combustion engine in an automotive vehicle, including the steps of determining crankshaft acceleration for an individual cylinder of the internal combustion engine and determining an average acceleration error for the individual cylinder based on the determined crankshaft acceleration. The method also includes the steps of determining an adaptive spark advance for the individual cylinder based on the determined average acceleration error and determining a new spark advance for the individual cylinder based on the determined adaptive spark advance and a nominal spark advance. The method further includes the steps of adjusting idle spark for the individual cylinder based on the new spark advance for the individual cylinder.

U.S. Pat. No. 6,571,776 discloses a method for controlling start of a compression ignition engine having a plurality of cylinders and without a cam sensor is provided. The method comprises providing a respective fuel delivery assembly for each cylinder and retrieving from memory a set of fuel delivery assembly firing rules and processing the firing rules so that a firing signal is delivered to each fuel delivery assembly on every crank revolution during a cranking mode of operation. The fuel delivery assembly is arranged to be responsive to any firing signal received during an injection window leading to a top position along the longitudinal axis so as to supply fuel to each cylinder during the injection window. The fuel delivery assembly is further arranged to be insensitive to any firing signal received during an exhaust stroke leading to the top position along said longitudinal axis so that no fuel is delivered to each cylinder during that exhaust stroke.

U.S. Pat. No. 6,889,663 discloses a method for controlling start of a compression ignition engine having a plurality of cylinders without a cam sensor. The method comprises providing a respective fuel delivery assembly for each cylinder. In one embodiment, the method further comprises retrieving from memory a set of fuel delivery assembly firing rules and then processing the firing rules so that a firing signal is delivered to each fuel delivery assembly on every crank revolution during a cranking mode of operation. The fuel delivery assembly is arranged to be responsive to any firing signal received during an injection window leading to the top position along the longitudinal axis so as to supply fuel to each cylinder during that injection window. The fuel delivery assembly is further arranged to be insensitive to any firing signal received during an exhaust stroke leading to the top position along said longitudinal axis so that no fuel is delivered to each cylinder during that exhaust stroke.

U.S. Pat. No. 7,069,140 discloses methods of cranking and/or operating an engine that eliminates the need for use of a cam sensor. The methods involve manipulating fuel injection command signals to occur out of their proper sequence, monitoring an engine indicator responsive to firing and non-firing of cylinders, and identifying correct engine phase based on fluctuations in the engine indicator. Also disclosed are software product embodiments comprising program code modules that cause an engine control unit to manipulate the generation of fuel injection command signals to take place outside of their correct sequence.

U.S. Pat. No. 7,155,330 discloses a method for controlling start of a compression ignition engine having a plurality of cylinders without a cam sensor. The method comprises providing a respective fuel delivery assembly for each cylinder. In one embodiment, the method further comprises retrieving from memory a set of fuel delivery assembly firing rules and then processing the firing rules so that a firing signal is delivered to each fuel delivery assembly on every crank revolution during a cranking mode of operation. The fuel delivery assembly is arranged to be responsive to any firing signal received during an injection window leading to the top position along the longitudinal axis so as to supply fuel to each cylinder during that injection window. The fuel delivery assembly is further arranged to be insensitive to any firing signal received during an exhaust stroke leading to the top position along said longitudinal axis so that no fuel is delivered to each cylinder during that exhaust stroke.

U.S. Pat. No. 5,562,082 discloses an internal combustion engine having a crankshaft sensor with an uneven tooth spacing to identify an index tooth corresponding in position to top dead center (TDC) of the number 1 cylinder. A microprocessor based engine controller determines from the sensor pulses each TDC event. During cranking, the number 1 cylinder compression stroke is detected from engine speed variations by measuring time periods over sample ranges before and after TDC. When a compression stroke occurs just before TDC, the period before TDC is greater than the period after TDC, whereas other TDC events are evidenced by the period before TDC being smaller than or equal to the period after TDC.

U.S. Pat. No. 5,758,625 discloses a method of generating a phase signal over 7200 for an internal combustion engine comprises a multi-point electronic injection system operating sequentially, permitting firing in only some of the cylinders during the starting stage and detecting an angular position in which the first firing occurs.

The patents described above are hereby expressly incorporated by reference in the description of the present invention.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of determining correct engine phase in an internal combustion engine without a cam sensor, the engine having a plurality of piston-cylinders that cause rotation of a crankshaft and a fuel delivery assembly associated with each of the plurality of piston-cylinders, the method comprising monitoring an engine parameter, modifying an amount of fuel delivered to a known piston-cylinder, advancing a spark time one of the plurality of piston-cylinders, and determining an actual engine phase based on a change in the engine parameter.

A system for determining correct engine phase in an internal combustion engine without a cam sensor includes an engine having a plurality of piston-cylinders that cause rotation of a crankshaft, a crankshaft sensor that senses a rotational speed of the crankshaft, a fuel delivery assembly for each of the plurality of cylinders, and a controller. The controller monitors an engine speed parameter for each of the plurality of piston-cylinders based on the rotational speed of the crankshaft, modifies an amount of fuel delivered by the fuel delivery assembly to a known piston-cylinder, and advances a spark time on one of the plurality of piston-cylinders. The controller then determines an actual engine phase based on a change in the engine speed parameter.

BRIEF DESCRIPTION OF THE DRAWINGS

Examples are described with reference to the following figures.

DETAILED DESCRIPTION OF THE DRAWINGS

Figure 1:
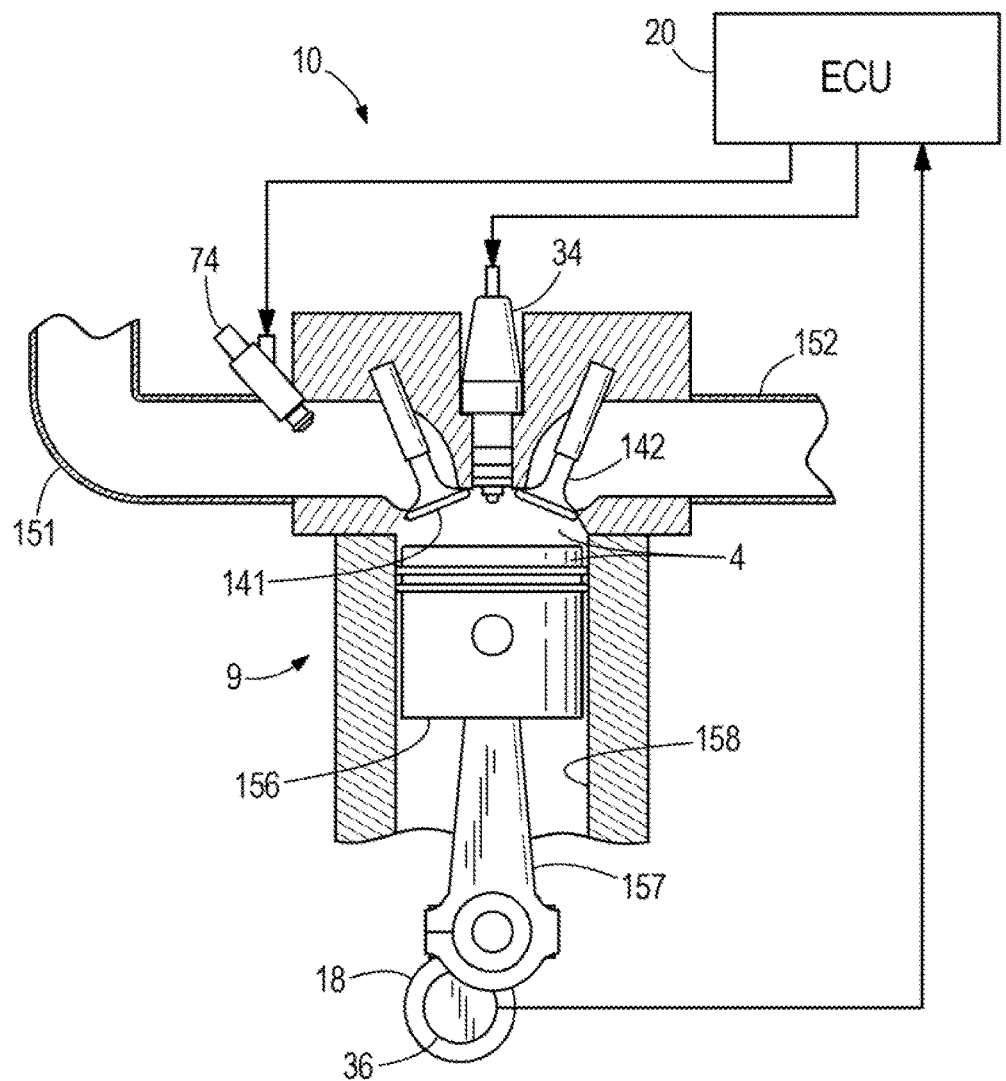
FIG. 1 depicts a cross section of an internal combustion engine having a fuel delivery assembly and an ignition system controlled by an engine control unit.

FIG. 1 depicts a cross section of an internal combustion engine having a fuel delivery assembly and an ignition system controlled by an engine control unit ("ECU") 20. The cross section of engine 9 has an intake manifold 151 and an exhaust manifold 152, which are in communication with a piston-cylinder 4 via an intake valve 141 and an exhaust valve 142. In an exemplary embodiment, the engine 9 comprises four piston-cylinders 1-4. The exemplary piston-cylinder 4 has a piston 156 and a cylinder 158. Within the cylinder 158 is piston 156 connected via a connecting rod 157 to a crankshaft 18. The cross section also comprises fuel injector 74 and a spark plug 34. In this example, the engine 9 is a non-direct injection engine and the fuel injector 74 injects fuel into the intake manifold 151. A sensor 36 is provided in this example for sensing a rotational speed and/or angular position of the crankshaft 18. The sensor 36 is provided in the vicinity of the crankshaft 18 and connecting rod 28 and senses the speed of the engine 9. The sensor 36 need not be located where shown but could be located elsewhere. Further, although not shown in this example, other engine running condition sensors could be provided, such as for example cylinder pressure sensors, manifold pressure sensors, temperature sensors, and throttle sensors. The exemplary system 10 comprises a fuel delivery assembly that is a non-direct injection system. As will be known by one of skill in the art, other fuel delivery assemblies may be employed to execute the systems and methods disclosed herein. For example, appropriate fuel delivery systems may include any direct injection and Multiport fuel injection (non-direct inject) systems.

Figure 2:
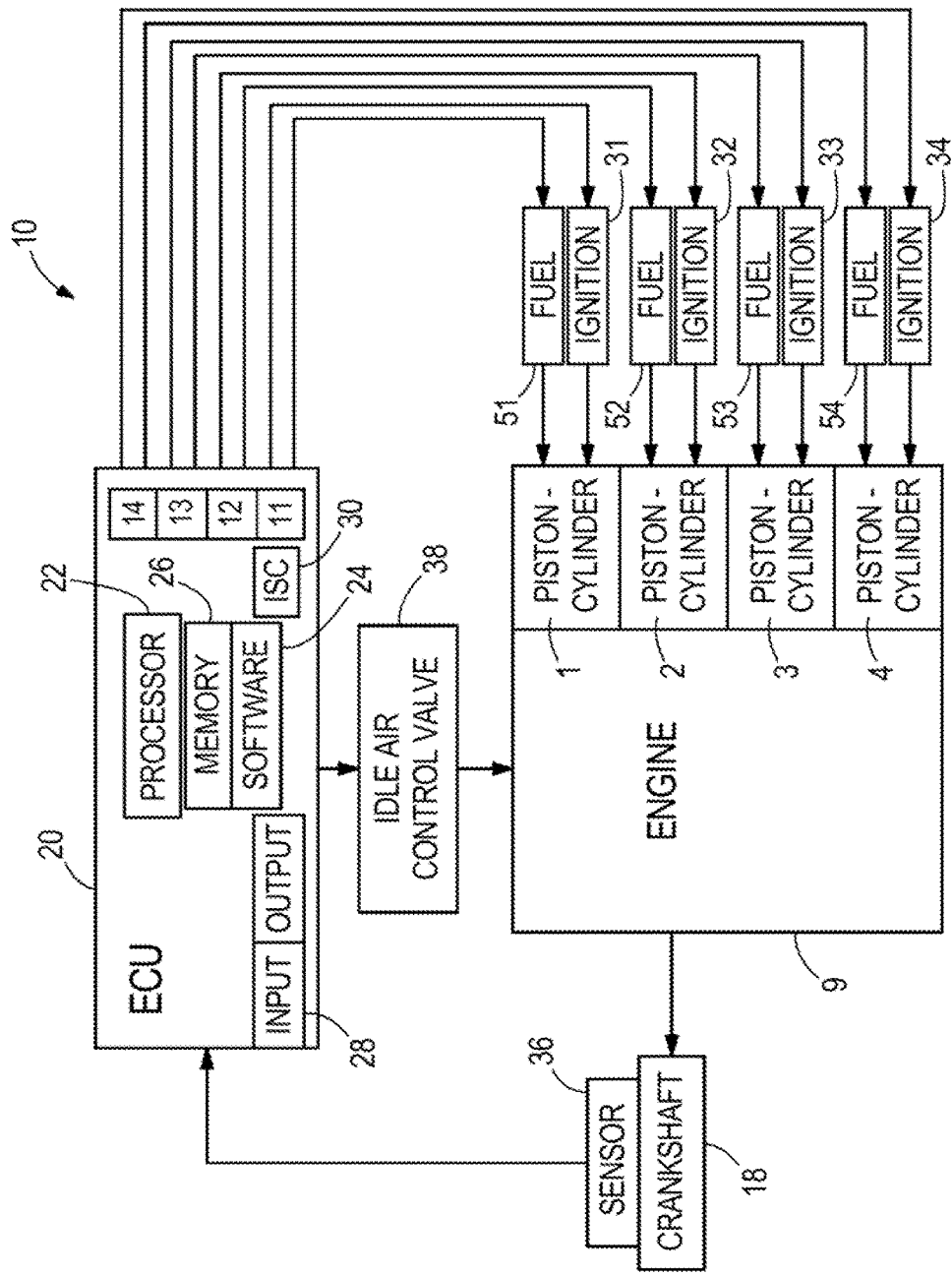
FIG. 2 depicts one embodiment of a system for determining correct engine phase in an internal combustion engine without a cam sensor.

FIG. 2 is a schematic showing a non-limiting example of a system 10 for controlling operations of an internal combustion engine 9, including a system for determining correct engine phase in an internal combustion engine without a cam sensor. In the example of FIGS. 1 and 2, the engine 9 is a four-stroke engine having four piston-cylinders 1-4 that are arranged in an inline formation. However the type of stroke and number of piston-cylinders can vary from that which is shown. For example, the methods and systems disclosed herein may be utilized in engines having any number of cylinders, including two, six, twelve, etc., as will become clear to one of ordinary skill in the relevant art. The arrangement of the piston-cylinders also can vary and in some examples can be arranged in a V-configuration or opposed-configuration instead of an inline configuration. As is conventional, reciprocation of the pistons in the cylinders causes rotation of a crankshaft 18, which in turn causes rotation of a camshaft. In situations where the engine 9 is configured for use in marine applications, rotation of the crankshaft 18 and camshaft causes rotation of one or more propulsors (e.g. propellers, impellers, and/or the like) for causing movement of a marine vessel. Such arrangements are known in the art and examples are disclosed in U.S. Pat. Nos. 7,806,741; 7,354,324; 7,299,783; 6,571,753; 6,295,963; 6,109,986; and 5,950,588, which are incorporated herein by reference.

The system 10 includes an Engine Control Unit (ECU) 20 for controlling operations of the engine 9. The ECU 20 is a programmable controller that includes a computer processor 22, software 24, memory (i.e. computer storage) 26 and an input/output (interface) device 28. The processor 22 loads and executes the software 24 from the memory 26. When executed, software 24 controls the engine 9 to operate according to the functionality described in further detail below. In some examples, the processor 22 can comprise a microprocessor and related circuitry that retrieves and executes software 24 from memory 26. Processor 22 can be implemented within a single device, or can alternately be distributed across multiple processing devices or sub-systems that cooperate in executing program instructions. Examples include general purpose central processing units, application specific processors, and logic devices, as well as any other type of processing device, combinations of processing devices, and/or variations thereof. Additional examples of suitable processors are disclosed in U.S. Pat. Nos. 7,941,253 and 6,273,771 which are incorporated herein by reference.

The ECU 20 includes an idle speed controller (ISC) 30, which can be a sub-system of the ECU 20 or a separate controller distinct from the processor 22, software 24, memory 26 and input/output device 28 of the ECU 20. For discussion purposes herein below, the ISC 30 is a sub-system of the ECU 20; however it should be recognized that this is a non-limiting example and the particular configurations of the ECU 20 and ISC 30 can vary from that which is shown and described. The ISC 30 is configured to maintain the engine 9 at a certain idle speed, which in this disclosure is referred to as an "idle speed setpoint." The idle speed setpoint can be a calibrated engine speed value that typically is selected by the manufacturer through trial and error so as to avoid stalling of the engine 9 when it is operated at idle speed and when it is shifted into forward or reverse gear. Other methods of selecting the idle speed setpoint are known in the art. The ISC 30 is configured to control one or more "combustion inputs" to the piston-cylinders 1-4 to thereby maintain the speed of the engine 9 at the noted idle speed setpoint. Examples of "combustion inputs" can include timing of ignition (i.e. spark provided by spark plugs of ignitions 31-34), quantity and/or rate of fuel provided to the engine, spark energy, spark duration, injection timing, quantity and/or rate of airflow provided to the engine 9 via an idle air control valve 38, and/or the like. In certain examples, the idle air control valve 38 can be an electronic valve located downstream of a main throttle body for the engine 9. The idle air control valve 38 typically is located in the intake air plenum for the engine 9. In certain examples, the ISC 30 can be a proportional integral derivative controller (PID) that calculates and monitors the rate of change of speed of rotation of the crankshaft 18 and how long the rate of change occurs. The ISC 30 is configured to compare the results of this calculation to one or more thresholds stored in the memory 26, and then modify one or more of the noted combustion inputs to thereby maintain the engine 9 at the idle speed setpoint. It will be recognized by one having ordinary skill in the art that the type of ISC 30 can also vary from that which is shown and described. In another example, idle airflow to the engine may be controlled by the ECU 20 via an electronically driven throttle. In this case, a separate idle air control valve is not needed.

The system 10 also includes a crankshaft sensor 36 that is configured to sense rotation and position of the crankshaft 18 and then provide electronic signals to the ECU 20 that represent the speed of rotation of the crankshaft 18 and the rotational position of the crankshaft 18. In certain examples, the crankshaft sensor 36 can be a conventional encoder that is located on the crankshaft 18; however any conventional sensor that is configurable to sense speed of rotation and communicate this information to the ECU can be utilized. In one example, the crankshaft sensor 36 is a rotary encoder that provides information about the angular position of the crankshaft 18 which is then used to determine a rotational speed of the crankshaft 18. The rotational speed of the crankshaft 18 may be sensed in this way over the course of an engine cycle. Thereby, the contribution of each piston-cylinder 1-4 to the rotation of the crankshaft 18 can be measured, such as by calculating a speed increase of the crankshaft 18 associated with a combustion event in each piston-cylinder 1-4. For example, a rotary encoder having teeth providing trigger points at defined locations around the circumference may be employed, such as a Hall Effect gear tooth sensor. The encoder may be fixed to the crankshaft 18 such that the rotation of the crankshaft 18 is sensed by detecting the passing of each tooth on the encoder.

System 10 also includes a fuel delivery assembly 51-54 for each piston-cylinder 1-4. As shown in the exemplary embodiment of FIG. 1, each fuel delivery assembly 51-51 may include a fuel injector 74 physically connected to each piston-cylinder 1-4. The ECU 20 controls the fuel injector 74 in order to deliver an amount of fuel to that piston-cylinder.

Upon engine startup, the ECU 20 does not know where the engine left off at last shutoff, and thus the ECU 20 does not know which piston-cylinder 1-4 fires first and what phase the engine is at on any given rotation of the crankshaft 18. In one embodiment, the plurality of piston-cylinders are grouped into two sets, wherein one set of piston-cylinders fire during one 360° rotation of the crankshaft and the other set of piston-cylinders fires on the next 3600 rotation of the crankshaft 18. The ECU 20 can differentiate between the piston-cylinders in a set based on the crank angle; however, the ECU 20 does not know which cycle the engine is on and thus which set of cylinders is firing in that 360° rotation of the crankshaft 18. Referring to the example in FIG. 7, the combustion event order in the piston-cylinders could be 1, 3, 4, 2, where 1 and 3 are paired in one set, and 2 and 4 are paired in another set. The pistons of piston-cylinders 1 and 4 reach top-dead center at the same time, one on the top-dead-center power stroke and the other on the top-dead-center exhaust stroke. The same is true for piston-cylinders 3 and 2. During a first 360° rotation of the crankshaft 18, a firing event occurs in piston-cylinder 1 and then piston-cylinder 3. During the next 360° rotation of the crankshaft 18, a firing event occurs in piston-cylinder 4 and then in piston-cylinder 2. In the example, the ECU 20 can differentiate between cylinders 1 and 3 and between cylinders 4 and 2, but cannot differentiate upon startup between cylinders 1 and 4 or between 3 and 2.

During a period where the ECU 20 does not know the engine phase, it cannot accurately deliver the fuel at a specific engine crank angle. The ECU may control the fuel delivery assembly 51-54 for each piston-cylinder 1-4 to deliver fuel in a "split" sequence, where the required fuel is delivered in two half pulses twice as often—i.e. a half pulse every 360 degree rotation of the crankshaft 18. Further, the ignitions of the piston-cylinders may be tied together such that those cylinders that reach top-dead-center (TDC) at the same time also fire at the same time. In such an embodiment, the ignitions 31-34 fire twice as often and all four ignitions 31-34 fire on every 360° rotation of the crankshaft 18. However, only one of the piston-cylinders will produce power at a time, as the other piston-cylinder will receive the spark during the exhaust/intake stroke and thus no combustion will result. More specifically, if the spark timing is before TDC, it will occur during the exhaust stroke. If the timing is a couple of degrees after TDC on the combustion cylinder, its paired cylinder will be just starting the intake stroke. The spark will occur before the intake valve opens, which for example may be about 40 degrees after TDC, so no flammable gasses will have entered the cylinder yet and no combustion will occur.

Through experimentation and research, the present inventor recognizes that the spark times for each of the piston-cylinders 1-4 may be individually controlled without requiring that the ECU 20 know the actual engine phase. For example, U.S. patent application Ser. No. 14/640,924, which is expressly incorporated by reference in the description of the present invention, discloses a method and system for individually controlling spark time for each piston-cylinder without the need for identification of the actual engine phase. In such embodiment, the ECU 20 controls the spark time for each piston-cylinder 1-4 individually based on a known firing order of the ignitions 31-34 in conjunction with the rotational speed and position of the crankshaft 18 measured from the crankshaft sensor 36.

Though the engine 9 can be operated without the ECU 20 knowing the actual engine phase, it is desirable for the ECU 20 to identify the actual engine phase so that the fuel can be injected at the desired crank angle and so that the fuel delivery can be controlled more accurately and simply as a single fuel pulse. The inventor recognizes that the split fuel injection sequence can cause undesirable effects, especially when implemented over the entire operating period of an internal combustion engine. For example, the split fuel injection sequence may lead to increased error in fuel delivery because, by dividing the fuel injection into two separate pulses, any error in the fuel injection system may be doubled. Furthermore, the half injection pulse width may be too short such that the non-linear region of the fuel injectors' characterization may occupy too much of the fuel pulse, leading to injection of insufficient and/or inconsistent fuel amounts. Moreover, the split injection sequence forces at least half of the fuel to be injected at an undesired crank angle, which can have undesired effects on engine emissions.

Figures 3, 4:
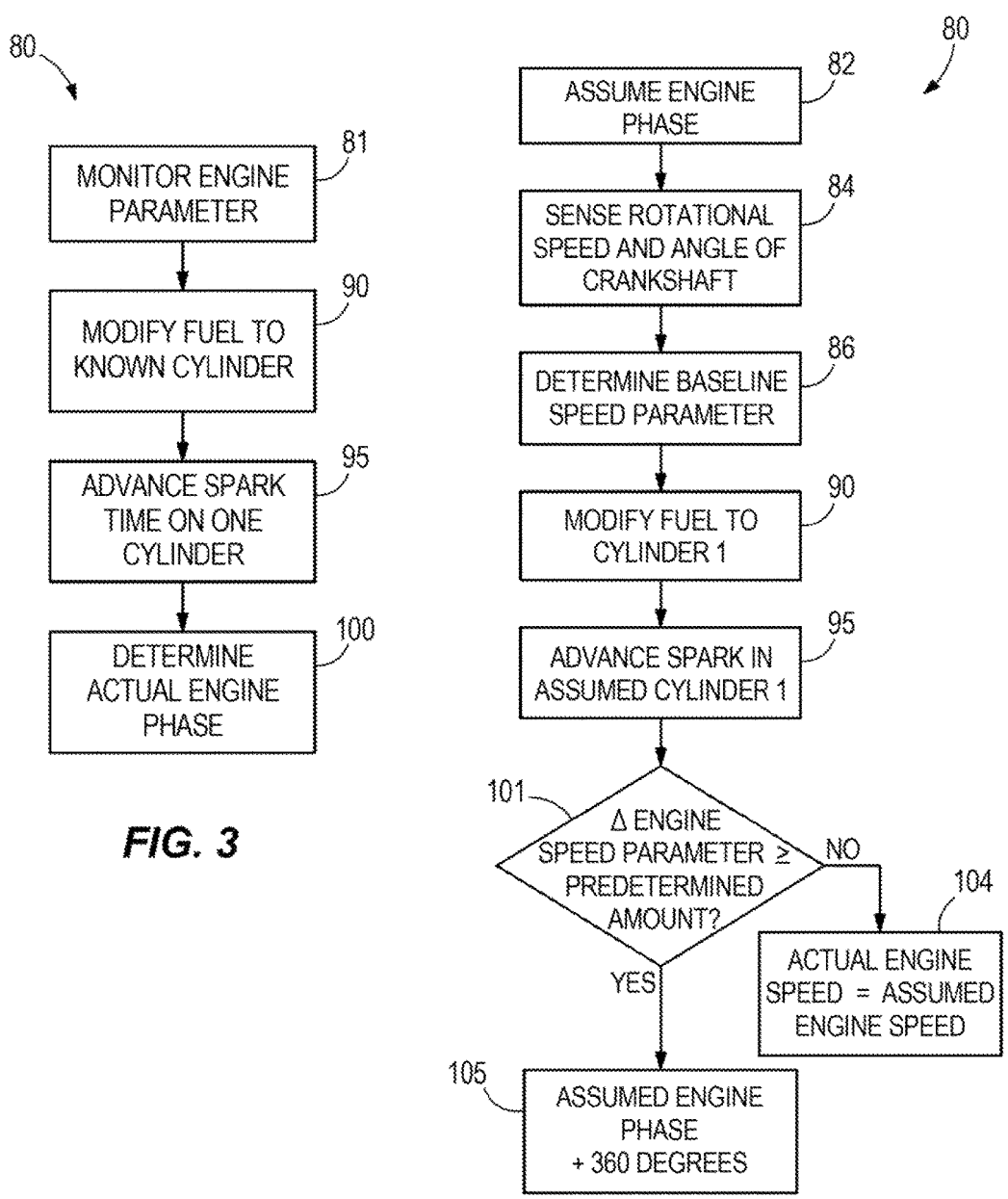
FIG. 3 is a flow chart depicting one exemplary method according to the present disclosure.
FIG. 4 is a flow chart depicting another exemplary method according to the present disclosure.

FIG. 3 demonstrates one embodiment of a method 80 for determining correct engine phase in an internal combustion engine without a cam sensor. At step 81, an engine parameter is monitored. The engine parameter may include any parameter that indicates the output associated with the combustion event in each piston-cylinder 1-4. For example, the engine parameter may be an engine speed parameter, such as speed increase of the crankshaft 18 or acceleration of the crankshaft 18 resulting from a firing event in a piston-cylinder 1-4. In other embodiments, the engine parameter may be a pressure increase associated with the combustion event in each of the piston-cylinders 1-4. In still other embodiments, the engine parameter may be an accelerometer (knock sensor) reading structure borne vibrations. At step 90, the fuel amount delivered to a known piston-cylinder is modified. Since the fuel delivery systems 51-54 are hard wired separately to the ECU 20, the ECU 20 can identify and control each fuel delivery assembly 51-54 separately and know which piston-cylinder 1-4 it delivers fuel to. The fuel to the known piston-cylinder may be decreased so that the piston-cylinder runs lean, or increased so that the piston-cylinder runs rich. Either way, the fuel modification will decrease the output from the combustion event in that piston-cylinder.

At step 95, the spark time is advanced on one piston-cylinder. If the spark advancement is applied to the same piston-cylinder as that receiving the modified fuel amount, the known piston-cylinder, then the increased performance caused by the spark advancement will counteract the decreased performance caused by the fuel modification. In that instance, the engine parameter will not see a significant change and the change reflected will be less than a predetermined amount. In that instance, the ECU 20 can determine that the cylinder receiving the spark advancement is the known cylinder. However, if the spark advancement is applied to a piston-cylinder other than the known piston-cylinder receiving the modified fuel, then a significant change will be seen in the engine parameter—e.g., the engine parameter associated with one or more of the piston-cylinders will change by at least a predetermined amount. In that instance, the engine parameter will reflect a decrease in output from the known piston-cylinder receiving the modified fuel and will reflect an increase in output from the piston-cylinder receiving the spark advancement. In that instance, the ECU 20 would determine that the piston-cylinder receiving the spark advancement is not the known piston-cylinder.

Figure 5:
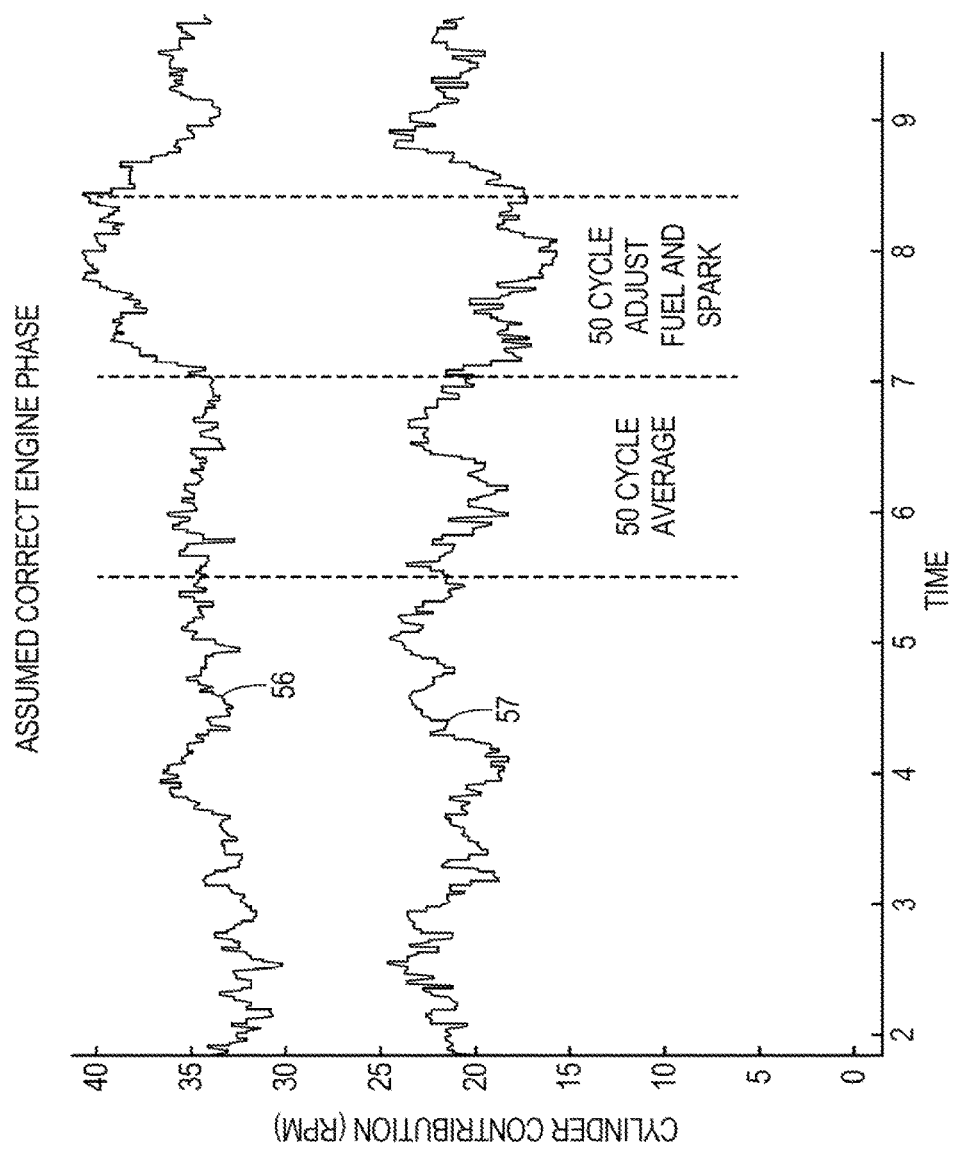
FIG. 5 is a graph depicting rpm increases of two piston-cylinders of an internal combustion engine over time employing systems and methods described herein.
Figure 6:
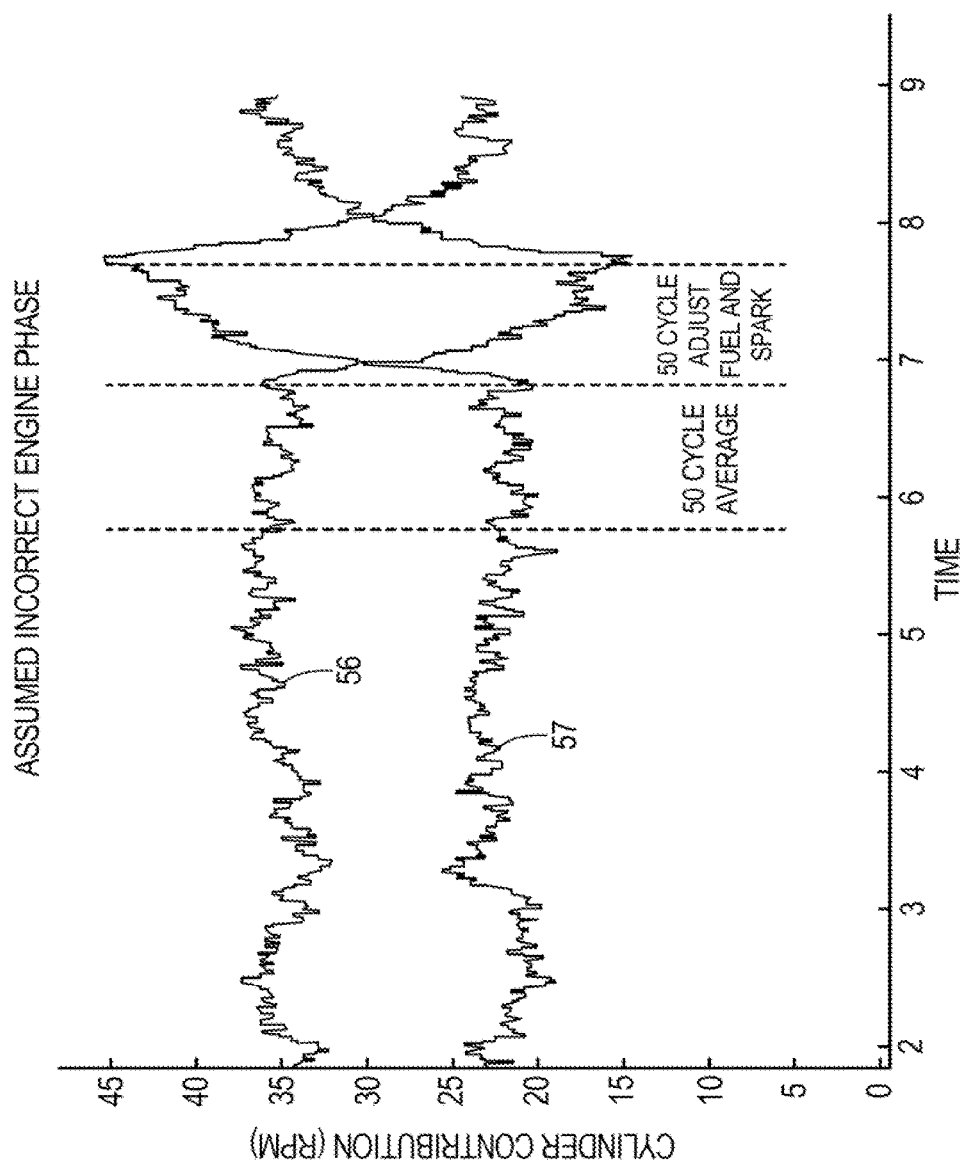
FIG. 6 is another graph depicting rpm increases of two piston-cylinders of an internal combustion engine over time employing systems and methods described herein.

The graph at FIGS. 5 and 6 exemplify this concept. There, the engine parameter reflecting cylinder contribution is speed increase measured in revolutions per minute (rpm), which is shown with respect to time. Line 56 is the rpm increase for a first piston-cylinder and line 57 is the rpm increase for a second piston-cylinder. In both FIGS. 5 and 6, the fuel modification and spark advancement are applied at approximately the seven second mark. FIG. 5 reflects the contributions of each of the two piston-cylinders where the fuel modification and spark advancement are applied to the same piston-cylinder. FIG. 6 reflects the contributions of the two piston-cylinders where the fuel modification and the spark advancement are applied to different piston-cylinders. Thus, FIG. 5 reflects no significant change in the rpm increase of the first piston-cylinder 56 or the rpm increase of the second piston-cylinder 57. By contrast, FIG. 6 demonstrates significant changes in both the rpm increase of the first piston-cylinder 56 and the rpm increase of the second piston-cylinder 57. Specifically, the rpm increase of the first piston-cylinder 56 sees a significant decrease around the seven second mark, reflecting that the fuel modification was applied to that piston-cylinder causing it perform poorly. Conversely, the rpm increase of the second piston-cylinder 57 saw a significant increase in the rpm increase value around the seven second mark, indicating that the spark advancement was applied to that piston-cylinder.

At step 100, the ECU 20 determines the actual engine phase based on the monitored engine parameter. If no significant change is reflected in the engine parameter, then the ECU 20 can determine that the piston-cylinder receiving the spark advancement is the known piston-cylinder. Conversely, if the ECU 20 detects significant changes in the monitored engine parameter, such as that reflected in the exemplary FIG. 6, then the ECU 20 can determine that the cylinder receiving the spark advancement is not the known cylinder. In one embodiment, a significant change may be a change in the engine parameter by more than a predetermined amount, which is a value set in the ECU 20 that provides reliable identification of an engine parameter change due to the fuel modification or the spark modification.

Figure 7:
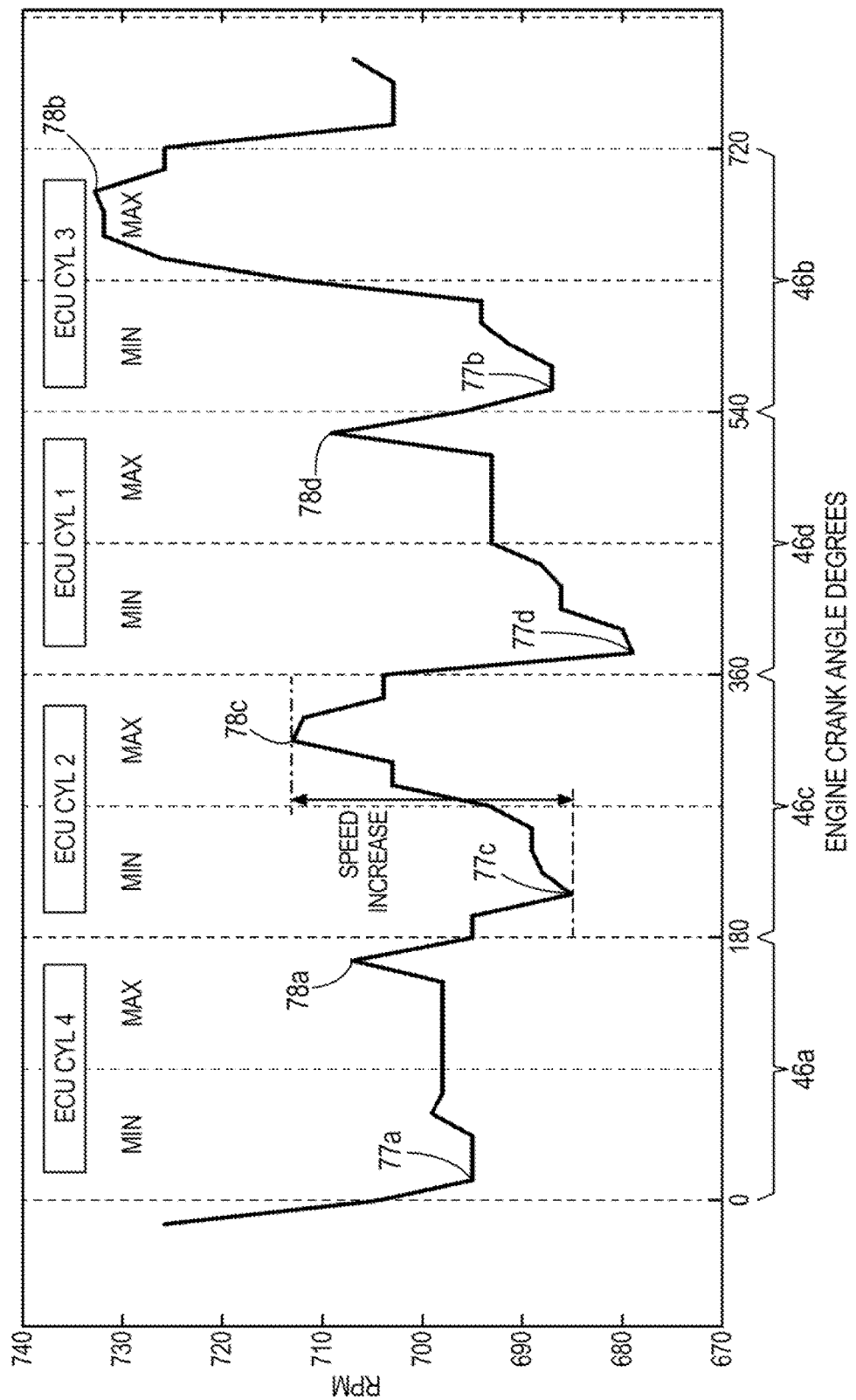
FIG. 7 is a graph depicting an exemplary rotational speed of a crankshaft in an internal combustion engine during one engine cycle exhibiting systems and methods described herein.

FIG. 4 provides another embodiment of a method of determining correct engine phase in an internal combustion engine without a cam sensor. At step 82, the ECU 20 assumes an engine phase. At step 84, the rotational speed and angle of the crankshaft 18 is sensed by the crankshaft sensor 36. One embodiment of steps 82 and 84 can be explained with reference to FIG. 7, which reflects the speed increase of the crankshaft 18 over one engine cycle. The ECU 20 made an initial assumption of an engine phase, for example based on the firing order and the known sets of piston-cylinders. In the example of FIG. 7, the ECU 20 assumes a cylinder order of 1, 3, 4, 2. The ECU 20 defines a crank angle window 46a-46d for each ECU cylinder 1-4 based on that assumed firing order. As described above, the assumed firing order may or may not be the actual firing order of the physical piston-cylinders. The crank angle windows 46a-46d define a portion of the rotation of the crankshaft 18 associated with a combustion event in that ECU cylinder 1-4. In FIG. 7, ECU cylinder 4 is assigned to the crank angle window of 0° to 180°, ECU cylinder 3 is assigned to 180° to 360°, ECU cylinder 1 is assigned to 360° to 540°, and ECU cylinder 2 is assigned to 540° to 720°. The speed increase for each ECU cylinder 1-4 is then determinable by detecting a minimum rotational speed 77 and a maximum rotational speed 78 within each crank angle window 46a-46d. For example, the speed increase for ECU cylinder 2 associated with the crank angle window 46c may be calculated as the maximum rotational speed 78c measured in that window minus the minimum rotational speed 77c measured in that window. Likewise, the speed increase for the piston-cylinder associated with the crank angle window 46a would be the rotational speed maximum 78a minus the rotational speed minimum 77a, and so on.

At step 86, a baseline engine speed value is determined for each piston-cylinder. The baseline engine speed value reflects the output of each piston-cylinder prior to modifying the fuel or advancing the spark. In one embodiment, the baseline may be an average of the speed parameter over a predefined number of engine cycles. In the embodiment exemplified in FIGS. 5 and 6, the baseline speed value is an average of the speed increases for each cylinder taken over fifty cycles. In another embodiment, the baseline speed value is the engine speed parameter at a defined point in time prior to applying the fuel and spark modifications. In still other embodiments, the baseline speed parameter may be calculated as exponentially weighted moving average or using a table lookup from other parameters. A spark advance is applied to the cylinder assumed to be cylinder 1, such as ECU cylinder 1 in FIG. 7. At step 101, if the engine speed parameter changes by at least a predetermined amount from the baseline speed value, then it is known that the ECU's assumption regarding engine phase was incorrect. At step 104, the ECU 20 determines that the assumption was correct the actual engine phase is equal to the assumed engine phase if the engine speed parameter has not changed by at least the predetermined amount. If the change in engine speed parameter is greater than or equal to the predetermined amount, then the ECU determines at step 105 that the assumption was correct and that the actual engine phase equals the assumed engine phase shifted by about 360 degrees.

Figure 8:
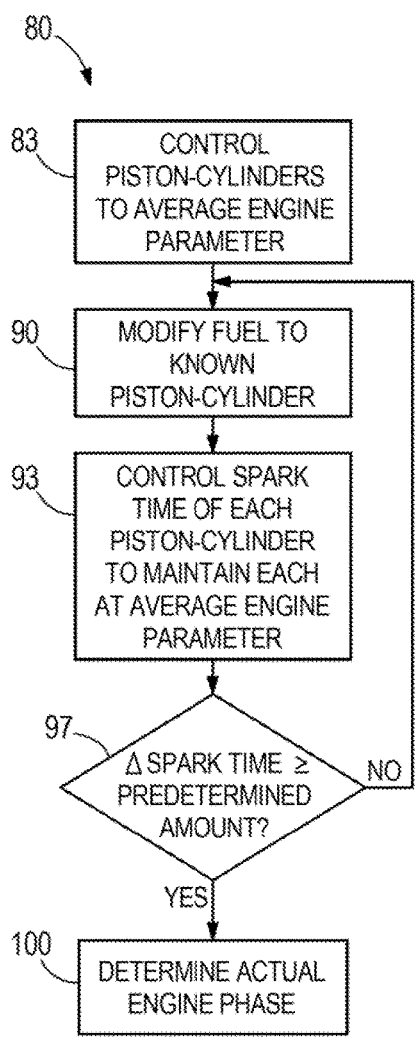
FIG. 8 is a flow chart depicting one exemplary method according to the present disclosure.
Figure 12:
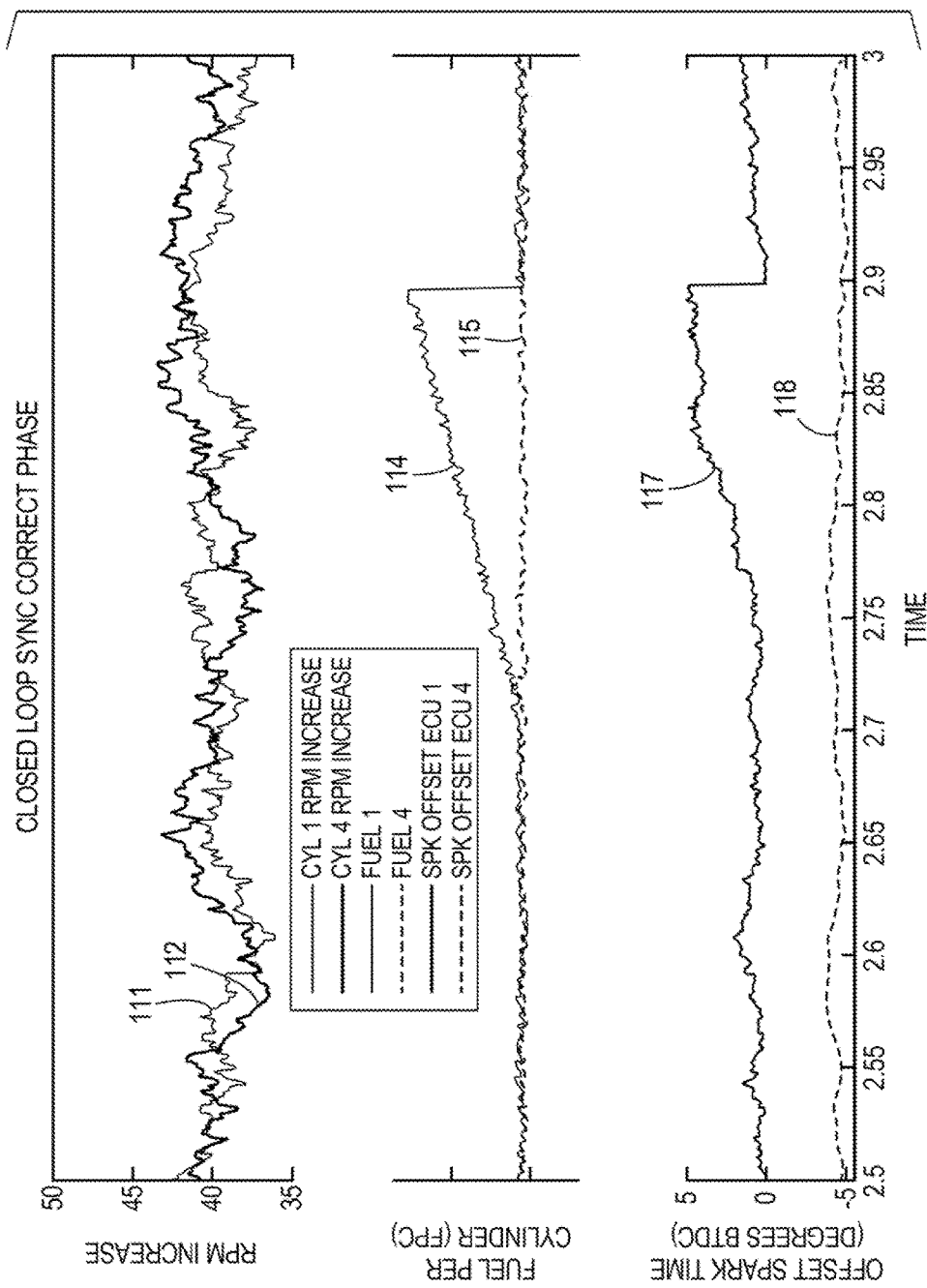
FIG. 12 is a graph depicting rpm increases, fuel rates, and spark offsets for two piston-cylinders and internal combustion over a period of time employing one embodiment of the systems and methods described herein.
Figure 13:
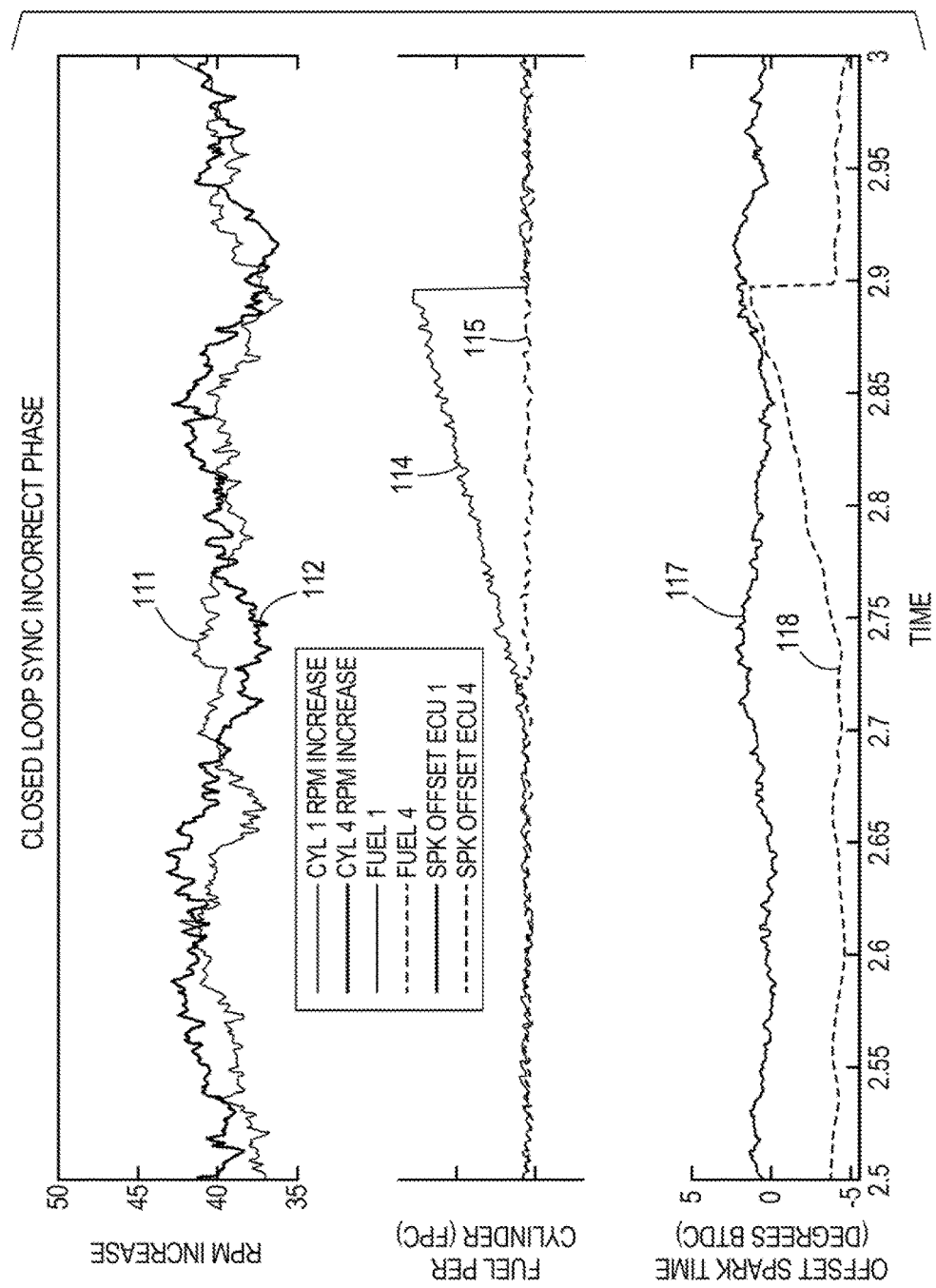
FIG. 13 is another graph depicting rpm increases, fuel rates, and spark offsets for two piston-cylinders and internal combustion over a period of time employing one embodiment of the systems and methods described herein.

FIG. 8 depicts another embodiment of a method of determining correct engine phase in an internal combustion engine without a cam sensor. At step 83, the piston-cylinders 1-4 are controlled to an average engine parameter. Methods of controlling the piston-cylinders to an average engine parameter may include controlling the cylinder speed increases to the average speed increase across the plurality of piston-cylinders, such as that disclosed in U.S. patent application Ser. No. 14/640,924, which has been incorporated herein by reference. In an alternative embodiment, the piston-cylinders may be controlled to the average acceleration parameter, such as by the method disclosed in U.S. patent application Ser. No. 14/489,075, which has been incorporated herein by reference. Accordingly, as a result of step 83, the output of each of the plurality of piston-cylinders will be approximately equivalent. For example, FIGS. 12 and 13 depict the speed increase of two separate cylinders, the cylinder 1 rpm increase 111 and the cylinder 4 rpm increase 112. It can be seen that the rpm increases 111 and 112 for the two separate piston-cylinders are close together in value.

At step 90, the fuel amount delivered to a known cylinder is modified. As described above, the fuel to a particular cylinder may be increased or decreased. For example, line 114 of FIGS. 12 and 13 depicts an increase in a fuel amount delivered to cylinder 1 over a period of about 0.2 seconds. Meanwhile, line 115 shows the fuel delivered to cylinder 4 remains constant. At step 93, the spark time of each piston-cylinder is controlled to maintain the output of each of the plurality of piston-cylinders at the average engine parameter. For example, the ECU 20 may calculate a spark offset for each piston-cylinder in order to maintain the speed increase or the acceleration of the crankshaft associated with each piston-cylinder at an average value as is disclosed in U.S. patent application Ser. Nos. 14/640,924 and 14/489,075, which have been incorporated herein by reference.

FIGS. 12 and 13 depict one embodiment where the ECU 20 calculates a spark offset based on an assumed engine phase. Line 117 shows the spark offset for ECU 1 in degrees before top dead center (degrees bTDC). Similarly, line 118 shows the spark offset for ECU 4 in degrees bTDC. The change in spark offset reflects the spark adjustment needed to compensate for the modified fuel amount in order to keep the corresponding cylinder performing at the average engine parameter. Referring for example to FIG. 12, the spark offset increase reflected in line 117 is the increase calculated to maintain the cylinder 1 rpm increase 11*l* at the average value.

At step 97, the ECU 20 determines whether the spark time has changed by at least a predetermined amount. In other words, the fuel to the known piston-cylinder is continuously modified until one spark time changes, or advances, by at least a predetermined amount. If the spark time to one of the piston-cylinders has not advanced by at least a predetermined amount, the system returns to step 90 and further modifies the fuel to the known cylinder until the spark time reaches the required change. At step 100, the actual engine phase is then determined based on which piston-cylinder is associated with the spark time that changed by at least the predetermined amount.

Figure 9:
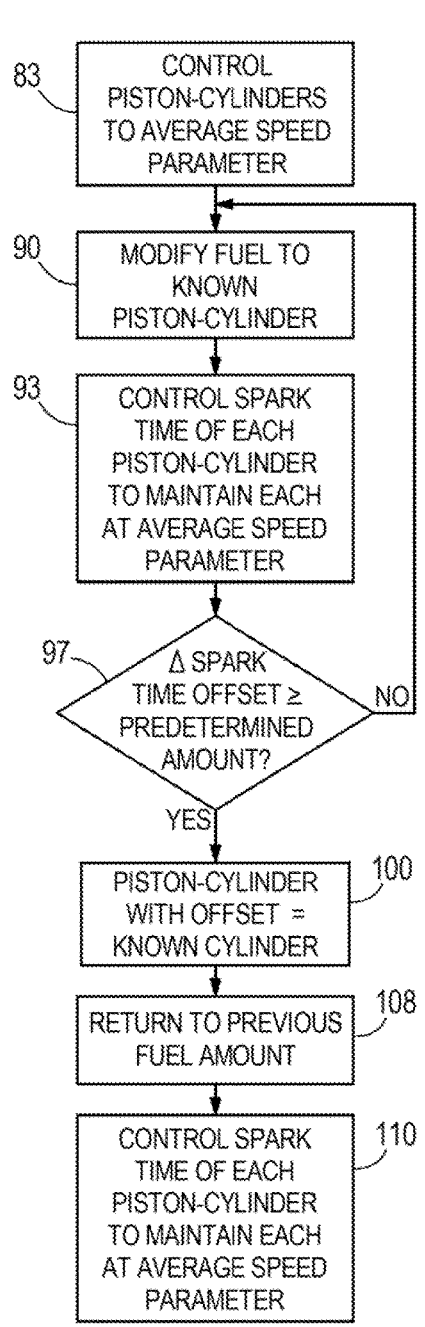
FIG. 9 is a flow chart depicting another exemplary method according to the present disclosure.

FIG. 9 presents another embodiment of a method of determining correct engine phase in an internal combustion engine without a cam sensor. At step 83, all of the piston-cylinders are controlled to an average engine speed parameter value, such as an average speed increase or an average acceleration. Once the outputs of the plurality of piston-cylinders have reached the average, step 90 is executed to modify the fuel amount delivered to a known piston-cylinder. At step 93, the spark time of each piston-cylinder is controlled to maintain the output of each piston-cylinder at the average speed parameter value.

Figure 11:
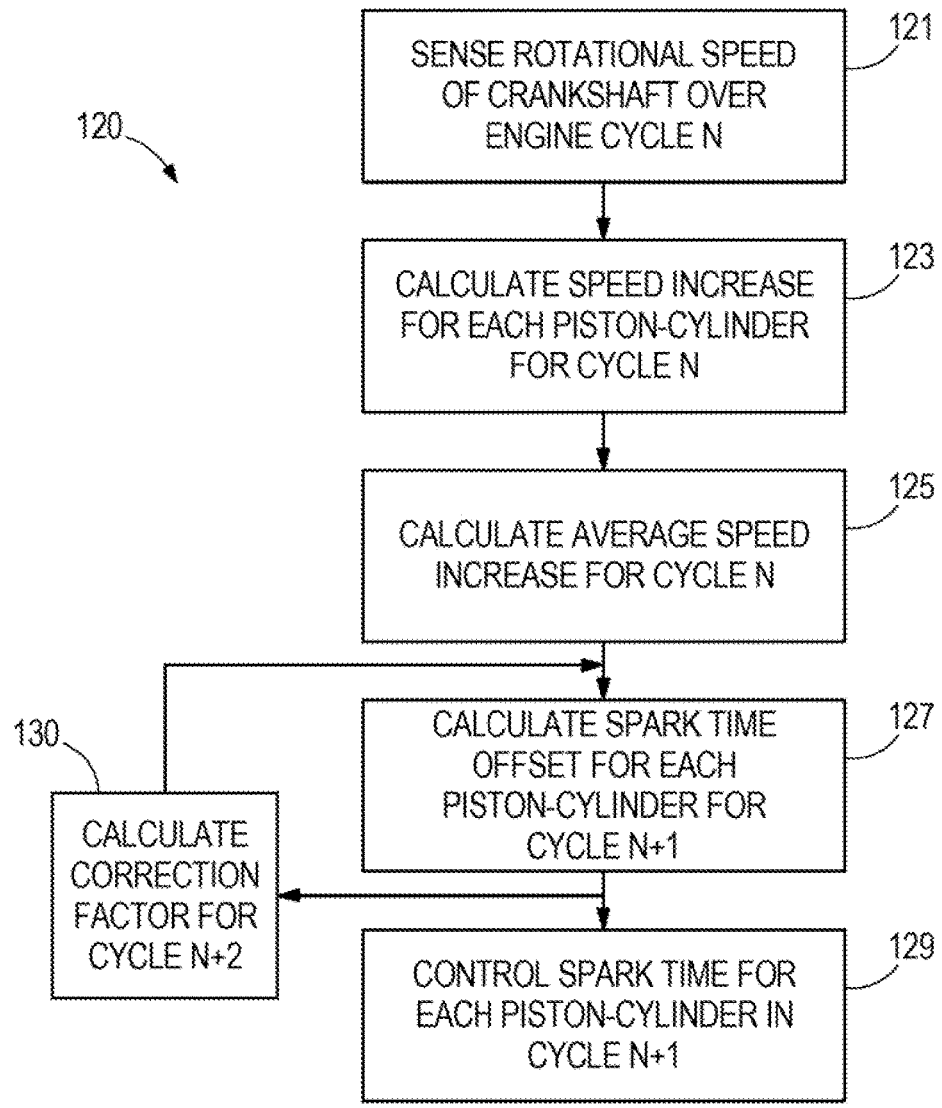
FIG. 11 is a flow chart depicting another exemplary method according to the present disclosure.

In one embodiment shown at FIG. 11, a method 120 of controlling spark time to an average engine parameter value includes controlling spark times to an average speed increase. At step 121, the rotational speed of the crankshaft is sensed throughout an engine cycle N. One engine cycle may equal 720° of rotation of the crankshaft. A speed increase is then calculated at step 123 for each piston-cylinder for that engine cycle. The speed increase is calculated based on the rotational speed of the crankshaft 18 associated with a combustion event in a respective piston-cylinder. For example, the speed increase for each piston-cylinder may be a difference between a minimum rotational speed and a maximum rotational speed of the crankshaft 18 associated with the combustion event in the respective piston-cylinder. An average speed increase is then calculated for that engine cycle at step 125. More specifically, the average speed increase may be the sum of the speed increases for the piston-cylinders divided by 4 (the number of piston-cylinders). A spark time offset is then calculated for each piston-cylinder at step 127. The spark time offset for the next engine cycle N+1 is calculated based on the average speed increase for cycle N and the speed increase for the respective piston-cylinder for cycle N. The spark time offset calculation for cycle N+1 also accounts for the correction factor calculated based on the offsets calculated for cycle N. The spark time for each piston-cylinder is then controlled in cycle N+1 at step 129 based on the spark time offset calculated for that piston-cylinder at step 127.

Simultaneously or subsequently, the correction factor is calculated at step 130 to be applied to a subsequent spark time offset calculation at the next execution of step 127, which would be the spark time offset calculated for engine cycle N+2. The purpose of the correction factor is to cause the sum of the spark time offsets for the plurality of piston-cylinders to be approximately zero so that no net torque increase or decrease is applied to the crankshaft 18 over one engine cycle. In one embodiment, the correction factor may be an average of previous spark time offsets for the piston-cylinders from the previous engine cycle. The correction factor may be used to adjust an error accumulation value for each of the piston-cylinders, such as by subtracting the correction factor from an integral term calculated by a PID controller 11-14 for each piston-cylinder. In context of the method 120 illustrated at FIG. 11, the spark time offset for each piston-cylinder calculated at step 127 for engine cycle N+1 would be the average of the spark time offsets for the piston-cylinders applied in cycle N.

Returning to FIG. 9, the fuel to the known piston-cylinder is modified at step 90 and the spark time is advanced at step 93 to compensate for that fuel adjustment until, at step 97, the spark time offset of one piston-cylinder advances by at least a predetermined amount. In one embodiment, a baseline spark time offset is calculated for each ECU cylinder 1-4 prior to executing steps 90 and 93 as an average of the spark time offset over a set number of engine cycles, for example as an average a set number of outputs of the corresponding PID controller 11-14. The change in spark time offset would then be calculated as a difference between the baseline and any given spark time offset. In another embodiment, the spark offset may be determined to advance by at least a predetermined amount if the spark time offset advances at more than a predetermined rate.

Once it is detected at step 97 that the spark time offset for one piston-cylinder has advanced by at least a predetermined amount, the ECU 20 can determine whether the piston-cylinder associated with the change in spark time offset is the known piston-cylinder that received the modified fuel amount. Once the actual engine phase is determined at step 100, the fuel delivery to the known piston-cylinder returns to its pre-modified value at step 108. Likewise, the spark time offset that was calculated to adjust for the fuel modification is removed at step 110. Specifically, at step 110, the ECU 20 continues to control the spark time of each piston-cylinder to maintain the output of each piston-cylinder at the average speed parameter, thus removing the adjustment to the spark time that was made to compensate for the fuel modification.

Figure 10:
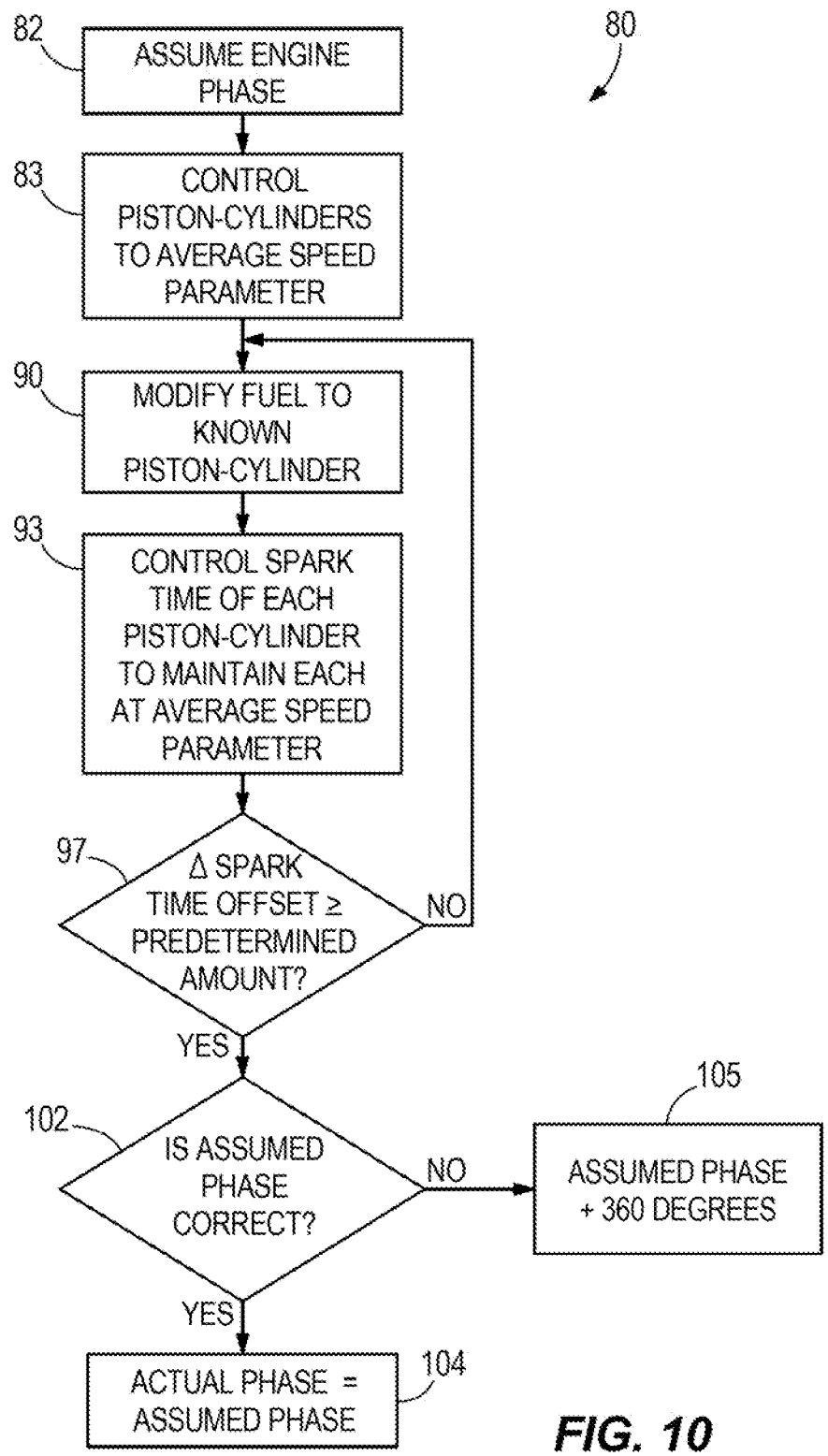
FIG. 10 is a flow chart depicting another exemplary method according to the present disclosure.

FIG. 10 provides another embodiment of a method 80 of determining correct engine phase in an internal combustion without a cam sensor. The engine phase is assumed at step 82. At step 83, the ECU cylinders 1-4 are controlled to an average speed parameter. The fuel to the known piston-cylinder is modified at step 90 and the spark time of each ECU cylinder 1-4 is controlled to maintain each ECU cylinder at an average speed parameter at step 93. The fuel is increasingly modified at step 90 and the spark time controlled at step 93 until it is determined at step 97 that the spark time offset has changed by at least a predetermined amount. The ECU 20 determines based on the assumed engine phase which ECU cylinder it assumes is associated with the changed spark time offset. If the engine phase assumption was correct at step 102, the ECU determines at step 104 that the actual engine phase is the assumed engine phase. FIG. 12 highlights this scenario. The spark time offset 117 for ECU cylinder 1 matches the actual piston-cylinder 1 that received the modified fuel (line 114). On the other hand, the ECU 20 determines that the assumed engine phase is incorrect at step 102 if the ECU cylinder assumed to be associated with the changed spark time offset is not equivalent to the known piston-cylinder that received the modified fuel. That scenario is exemplified in FIG. 13 where the change in spark time offset is reflected in line 118 associated with ECU cylinder 4, but the fuel change was made to the known piston-cylinder 1 (line 114). Thus, the ECU 20 assumed an incorrect engine phase at step 82, which is corrected at step 105 when the actual engine phase is determined to be the assumed engine phase shifted by about 360°.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A method of determining correct engine phase in an internal combustion engine without a cam sensor, the engine having a plurality of piston-cylinders that cause rotation of a crankshaft and a fuel delivery assembly associated with each of the plurality of piston-cylinders, the method comprising:
monitoring an engine parameter,
modifying a fuel amount delivered to a known piston-cylinder;
advancing a spark time on one of the plurality of piston-cylinders; and
determining an actual engine phase based on a change in the engine parameter.

2. The method of claim 1 further comprising a first step of assuming an engine phase; and advancing the spark time on the piston-cylinder assumed to be receiving the modified fuel amount based on the assumed engine phase.

3. The method of claim 2 wherein the step of determining an actual engine phase includes comparing the change in the engine parameter to a predetermined amount such that, if the engine parameter changes by at least the predetermined amount, the actual engine phase is determined to be the assumed engine phase shifted by about 180 degrees, and if the engine parameter changes by less than the predetermined amount, the actual engine phase is determined to be the assumed engine phase.

4. The method of claim 1 wherein monitoring an engine parameter comprises calculating at least one of a speed increase of the crankshaft, an acceleration of the crankshaft, and a cylinder pressure increase for each of the plurality of piston-cylinders for every combustion event in that piston-cylinder.

5. The method of claim 4 further comprising calculating the speed increase for each of the plurality of piston-cylinders as a difference between a minimum rotational speed and a maximum rotational speed of the crankshaft associated with a combustion event in that piston-cylinder.

6. The method of claim 5 further comprising calculating a baseline speed increase for each of the plurality of piston-cylinders prior to modifying the amount of fuel and advancing the spark; and
wherein determining the actual engine phase includes determining if, after modifying the amount of fuel and advancing the spark, the speed increase for any of the plurality of piston-cylinders differs from the baseline speed increase for that piston-cylinder by at least a predetermined amount.

7. The method of claim 6 wherein the baseline speed increase is an average of the speed increases for the respective piston-cylinder over a predetermined number of engine cycles.

8. The method of claim 4, further comprising a first step of controlling the spark time for each piston-cylinder to cause the engine parameter for each piston-cylinder to equal to an average engine parameter value for the plurality of piston-cylinders;
calculating a spark time offset for each piston-cylinder in order to maintain the engine parameter for each piston-cylinder at the average engine parameter value; and
modifying the amount of fuel delivered to the known piston-cylinder until one of the spark time offsets advances by at least a predetermined amount.

9. The method of claim 8 further comprising identifying the piston-cylinder associated with the spark time offset that advances by the predetermined amount as the known piston-cylinder.

10. The method of claim 8, further comprising:
assuming an engine phase;
determining that the actual engine phase is the assumed engine phase if the piston-cylinder assumed to be associated with the spark time offset that advances by the predetermined amount is the same as the known piston-cylinder; and
determining that the actual engine phase is the assumed engine phase shifted by about 360 degrees if the piston-cylinder assumed to be associated with the spark time offset that advances by the predetermined amount is not the same as the known piston-cylinder.

11. The method of claim 1 further comprising delivering half of the modified amount of fuel twice per engine cycle until the actual engine phase is determined.

12. A system for determining correct engine phase in an internal combustion engine without a cam sensor, the system comprising:
an engine having a plurality of piston-cylinders that cause rotation of a crank shaft;
a crankshaft sensor that senses a rotational speed of the crankshaft;
a fuel delivery assembly for each of the plurality of piston-cylinders;
a controller that
monitors an engine speed parameter for each of the plurality of piston-cylinders based on the rotational speed of the crankshaft;
modifies an amount of fuel delivered by the fuel delivery assembly to a known piston-cylinder;
advances a spark time on one of the plurality of piston-cylinders; and
determines an actual engine phase based on a change in the engine speed parameter.

13. The system of claim 12 wherein the engine speed parameter is one of a speed increase of the crankshaft and an acceleration of the crankshaft.

14. The system of claim 13 wherein the controller assumes an engine phase, and then advances the spark time on the piston-cylinder assumed to be receiving the modified fuel amount based on the assumed engine phase.

15. The system of claim 14 wherein, if the engine speed parameter changes by at least a predetermined amount, the controller determines the actual engine phase to be the assumed engine phase shifted by about 180 degrees; and
if the engine speed parameter changes by less than the predetermined amount, the controller determines the actual engine phase to be the assumed engine phase.

16. The system of claim 15 wherein the controller calculates a baseline speed value for each of the plurality of piston-cylinders prior to modifying the amount of fuel and advancing the spark, and wherein the controller determines whether the engine speed parameter changes by at least the predetermined amount from the baseline speed value.

17. The system of claim 13 wherein the engine speed parameter is the speed increase of the crankshaft calculated as a difference between a minimum rotational speed and a maximum rotational speed of the crankshaft associated with a combustion event in the respective piston-cylinder.

18. The system of claim 12 wherein the controller controls the spark time for each of the plurality of piston-cylinders to cause the engine speed parameter for each piston-cylinder to equal to an average engine speed parameter value for the plurality of piston-cylinders;
    calculates a spark time offset for each piston-cylinder in order to maintain the engine speed parameter for each piston-cylinder at the average engine speed parameter value;
    modifies the amount of fuel delivered to the known piston-cylinder until one of the spark time offsets advances by a predetermined amount; and
    determines the actual engine phase based on which piston-cylinder is associated with the spark time offset that advances by the predetermined amount.

19. The system of claim 18 wherein the controller assumes an engine phase; and
    determines that the actual engine phase is the assumed engine phase if the piston-cylinder assumed to be associated with the spark time offset that advances by the predetermined amount is the same as the known piston-cylinder, and determines that the actual engine phase is the assumed engine phase shifted by 360 degrees if the piston-cylinder assumed to be associated with the spark time offset that advances by the predetermined amount is not the same as the known piston-cylinder.

20. The system of claim 12 wherein the fuel delivery assembly delivers half of the modified amount of fuel to the known cylinder twice per engine cycle until the actual engine phase is determined.

* * * * *